United States Patent [19]

Cunliffe et al.

[11] Patent Number: 5,740,348
[45] Date of Patent: Apr. 14, 1998

[54] SYSTEM AND METHOD FOR SELECTING THE CORRECT GROUP OF REPLICAS IN A REPLICATED COMPUTER DATABASE SYSTEM

[75] Inventors: Joseph E. Cunliffe; Dale R. Passmore, both of Colorado Springs, Colo.

[73] Assignee: Sun Microsystems, Inc., Mountain View, Calif.

[21] Appl. No.: 673,082

[22] Filed: Jul. 1, 1996

[51] Int. Cl.$^6$ .................................................. G06F 11/18
[52] U.S. Cl. ...................... 395/182.04; 707/10; 707/202
[58] Field of Search ........................... 395/182.04, 441, 395/608, 610, 617, 618; 707/9, 10, 201, 202; 371/36; 701/114

[56] References Cited

U.S. PATENT DOCUMENTS

| | | |
|---|---|---|
| 4,789,986 | 12/1988 | Koizumi et al. |
| 4,974,156 | 11/1990 | Harding et al. ........................... 364/489 |
| 5,210,865 | 5/1993 | Davis et al. ........................... 395/182.04 |
| 5,276,860 | 1/1994 | Fortier et al. ........................... 395/182.04 |
| 5,404,508 | 4/1995 | Konrad et al. ........................... 395/182.04 |
| 5,408,656 | 4/1995 | Cohn et al. ........................... 395/604 |
| 5,412,791 | 5/1995 | Martin et al. ........................... 395/441 |
| 5,446,884 | 8/1995 | Schwendemann et al. ............. 395/618 |
| 5,454,099 | 9/1995 | Myers et al. ........................... 395/182.04 |
| 5,535,411 | 7/1996 | Speed et al. ........................... 395/182.04 |
| 5,586,247 | 12/1996 | Yoshifuji et al. ...................... 395/182.04 |
| 5,586,310 | 12/1996 | Sharman ................................. 395/600 |
| 5,613,107 | 3/1997 | Villette et al. ........................... 395/617 |

OTHER PUBLICATIONS

Paris et al., "Protecting Replicated Objects Against Media Failures", 1992, IEEE, pp. 109–115.
Tang, "Voting Class–An Approach to Achieving High Availability for Replicated Data", 1990, IEEE, pp. 146–155.
Paris et al., "Voting With Regenerable Volatile Witnessess", 1991, IEEE, pp. 112–119.

*Primary Examiner*—Robert W. Beausoliel, Jr.
*Assistant Examiner*—Scott T. Baderman
*Attorney, Agent, or Firm*—William J. Kubida; Stuart T. Langley; Holland & Hart LLP

[57] ABSTRACT

A system, method and computer program product for ensuring that a replicated computer database does not encounter a "split brain" problem by replicating the database and requiring a replica quorum wherein at least (50% +1) of the replicas are accessible and in agreement. When a replica quorum in not obtainable, but 50% of the copies of the data are in agreement, an external source, or "mediator", is called upon to provide a deciding vote (+1) to ensure that the data can be trusted.

18 Claims, 7 Drawing Sheets

SYSTEM AND METHOD FOR SELECTING THE CORRECT GROUP OF REPLICAS IN A REPLICATED COMPUTER DATABASE SYSTEM

CROSS REFERENCE TO RELATED APPLICATIONS

The present invention is related to the subject matter disclosed in U.S. patent application Ser. No. 08/643,550 filed on May 6, 1996 for "System and Method for Automatically Distributing Copies of a Replicated Database in a Computer System", assigned to Sun Microsystems, Inc., assignee of the present invention, the disclosure of which is herein specifically incorporated by this reference.

BACKGROUND OF THE INVENTION

The present invention relates, in general, to the field of computers and computer database systems incorporating a plurality of computer mass storage devices for storing data. More particularly, the present invention relates to a system and method for selecting the correct group of database copies, or "replicas", in a replicated database in a computer system.

In a replicated computer database system, database replicas are distributed across various physical computer mass storage devices, such as individual disk drives, storage subsystems or "disksets", in order to ensure that the loss of a single drive, subsystem or diskset does not compromise the contents of the database. However, such replicated database systems must also guarantee that only the most recent (or valid) data is presented to the system from amongst the various replicas.

Shared sets of disk drives in multi-host computer systems often comprise a pair of host computers and a plurality of associated disk drives, each storing a portion of the database. Upon failure or unavailability of one or more of the system components, if the majority (i.e. 50%+1) of the copies of the data (the "replicas") which remain accessible are in agreement, then the data contained therein can be trusted. Agreement of data among 50% or less of the copies means that the data represented by the replicas is potentially invalid. In a symmetric disk configuration in particular, the replicas and data are distributed symmetrically and, as a consequence, if 50% of the system hardware fails, only 50% of the replicas and data copies are then available. In these instances, the data must be assumed to be potentially invalid since a majority (i.e. 50%+1) cannot be obtained. In these instances, a system administrator is generally then required to intervene and correct the problem so that potentially invalid data or "garbage" data will not be inadvertently used. After such administrative actions, the system data must then be validated.

Since, as noted above, replicated systems must guarantee that only the most recent data is being presented to the computer system, the worst case scenario that must be detected and prevented is a double device or subsystem failure, referred to as a "split brain" scenario. A simplified example of a split brain situation is one in which two identical copies of data (for example, data denominated "a" and "b") are both in use. At some point in time later, it can be supposed that "b" becomes unaccessible and "a" is in use. Thereafter, "a" becomes unaccessible and "b" becomes accessible and in use. This situation is then one in which "old", or potentially invalid data could be unknowingly provided. Worse yet, if at some time later "a" and "b" both become accessible and in use, different data can be provided to the computer system at different times, with no updates being done in between time.

SUMMARY OF THE INVENTION

Disclosed herein is a system, method and computer program product of a special utility in ensuring that a replicated computer database does not encounter a "split brain" problem. In accordance with the disclosure of the present invention, this is accomplished by replicating the database and requiring a replica quorum wherein at least (50%+1) of the replicas are accessible and in agreement. When a replica quorum in not obtainable, but 50% of the copies of the data are in agreement, an external source, or "mediator", is called upon to provide a deciding vote (+1) (a "third voter") to ensure that the data can be trusted.

The Solstice™ DiskSuite™ 4.0 computer program product, developed and licensed by Sun Microsystems, Inc., implements a particular embodiment of the present invention as herein disclosed in more detail. The DiskSuite product supports HA configurations that consist of a pair of host computers ("hosts") that share at least three strings of drives ("disksets") and utilize a particular computer program product to allow exclusive access to the data on those drives by one or the other of the hosts.

DiskSuite configuration and state information is stored in a database to ensure that the split brain problem does not occur. Mirrored disks provide accessibility to the data even when only one copy of the mirror is accessible because the state information indicating which part of the data on a mirrored drive is valid or invalid is guaranteed to be correct by the database. The split brain problem is then effectively obviated by replicating the database and requiring a "replica quorum". A replica quorum is obtained if at least (50%+1) of the replicas are accessible.

In this regard, as long as there are three or more replicas available on separate disks and controllers, the database can sustain single failures. On the other hand, if this majority (50%+1) is not attainable, but 50% of the copies of the data are in agreement and an external source is called upon to provide a deciding vote (+1), then the data can be trusted. In those instances wherein at least 50% the replicas cannot be updated, the DiskSuite computer program code panics the system in a fail-fast fashion. This ensures that the database driver will not continue when state information has not been safely stored.

To this end, particularly disclosed herein is a computer implemented method, and a computer program product of particular utility for implementing the method, which ensures the selection of a most current subset of a group of database copies in a replicated database of a computer system. The method comprises the steps of establishing at least one mediator for monitoring the currency of accesses to data in the group of database copies and comparing the data in each database copy of an available subset of the group of database copies. The method further comprises the steps of allowing for initial reliance on the data represented by more than half of the available subset of the group of database copies if the data therein is in agreement and alternative reliance on the data represented by half of the available subset of the group of database copies if the data therein is in agreement and the at least one mediator indicates that the data therein is most current.

Further particularly disclosed herein is a computer system of particular utility for use in conjunction with a replicated database. The computer system comprises a plurality of host computers coupled together through a network connection, with at least two of the plurality of host computers each controlling at least one of a number of computer mass storage devices containing at least one database replica. The computer system comprises at least one mediator established in conjunction with at least one of the plurality of host computers, the mediator for monitoring the currency of and accesses to data in the database replicas contained on the number of computer mass storage devices. The computer system may rely on data represented by more than half of an available subset of the database replicas if the data therein is in agreement and alternatively rely on the data represented by half of the available subset of the database replicas if the data therein is in agreement and the at least one mediator indicates that the data therein is most current.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
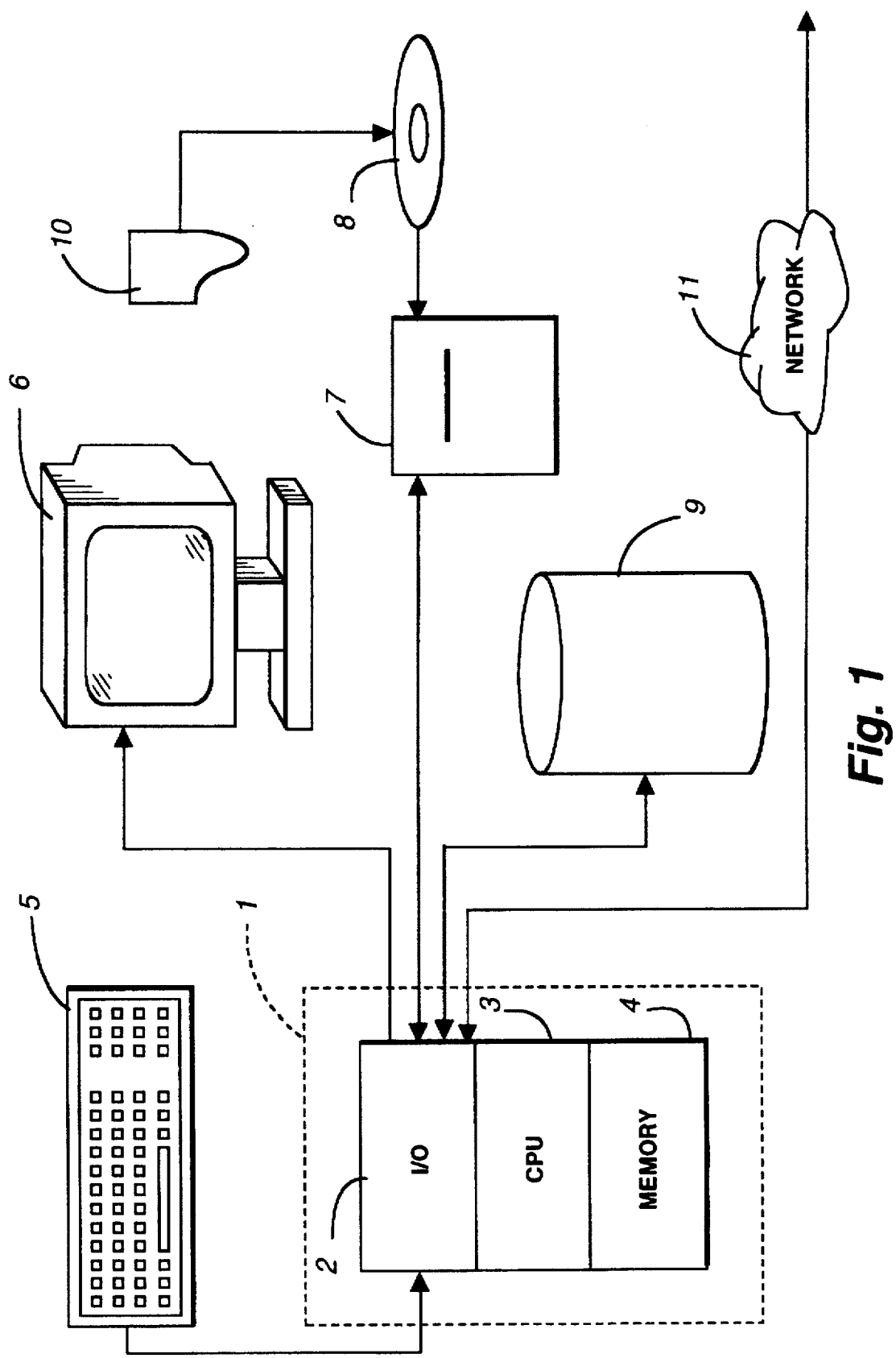
FIG. 1 is a simplified representational drawing of a general purpose computer forming a portion of the operating environment of the present invention.

The environment in which the present invention is used encompasses the general distributed computing system, wherein general purpose computers, workstations or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an input/output ("I/O") section 2, a central processing unit ("CPU") 3 and a memory section 4. The I/O section 2 may be connected to a keyboard 5, a display unit 6, a disk storage unit 9, a CDROM drive or unit 7 or a computer network 11 such as a wide area network ("WAN"), local area network ("LAN") or other network connection such as the Internet. The CDROM unit 7 can read a CDROM or CDROM medium 8 which typically contains programs 10 and data. The computer program products containing mechanisms to effectuate the apparatus and methods of the present invention may reside in the memory section 4, or on a disk storage unit 9 or on the CDROM 8 or network 11 of such a system.

Figure 2:
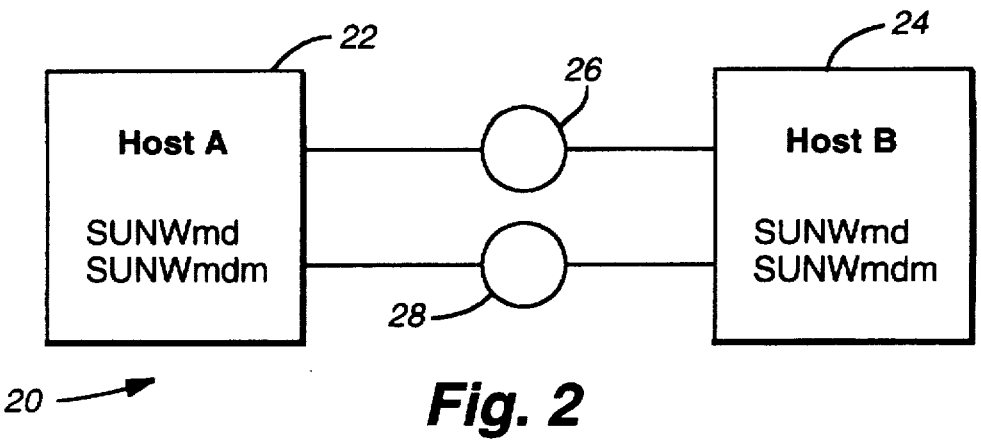
FIG. 2 is a simplified, representational block diagram of a typical dual host computer system incorporating, for example, a pair of shared storage device subsystems.

With reference additionally now to FIG. 2, a representative low-end HA configuration computer system 20 is shown for use with the DiskSuite computer program product. The computer system 20 comprises, in pertinent part, a pair of host computers (Host A) 22 and (Host B) 24. The hosts 22, 24 have access to at least a pair of computer mass storage device disk drives (or subsystems) 26 and 28 coupled to commonly connected buses.

Stated another way, such representative computer system 20 comprises a pair of hosts 22, 24 that share two strings of drives 26, 28 and are referred to as a "dual string" configuration. In accordance with current system configurations, the failure of any one of the string of drives 26, 28 results in access to the effected diskset being denied to both hosts 22, 24.

It would, however, be highly desirable that such a dual string computer system 20 survive the failure of a single host (Host A or Host B) or a single string of drives 26, 28, without user intervention. In the case where both a host (either host 22 or host 24) and a string of drives (either drive 26 or drive 28) fail (multiple failures), the data cannot be guaranteed and user intervention will be required to access the data.

As used hereinafter, the following terms shall have the meanings indicated:

DiskSuite™ State Database—a replicated database available from Sun Microsystems, Inc. which implements the system and method of the present invention and that is used to store the configuration of metadevices and the state of these metadevices.

Mediator—tracks which database Replicas are the most up-to-date. In the case that exactly half the database Replicas are accessible, the Mediator is used as a "third voter" ("TV") in determining whether access to the database Replicas can be granted or must be denied. A Mediator is data stored on any host (i.e. Host A, Host B or a third host computer), which is accessed and updated with standard RPC via the network. Mediator Data is individually verified before use, provides information of the location of other Mediators and contains a commit count. This commit count is identical to the commit count stored in the database Replicas.

Mediator Host—a host that is acting in the capacity of a "third voter" by running the rpc.metamedd(1m) daemon and has been added to a diskset.

Mediator Quorum—the condition achieved when HALF+1 (or 50%+1) of the Mediator Hosts are accessible. (e.g., 3 Mediator Hosts, the quorum is met when 2 Mediator Hosts are accessible [(3/2)+1=2]). In a dual string, the number of Mediator Hosts is 2, so both must be accessible [(2/2)+1=2].

Replica—a single copy of the relevant database. In a particular implementation of the present invention implemented in conjunction with Solstice DiskSuite, a replica is a single copy of the DiskSuite Database Replica Quorum—the condition achieved when HALF+1 of the Replicas are accessible. (e.g., 10 Replicas, the quorum is met when 6 Replicas are accessible [(10/2)+1=6]).

In a particular embodiment of the present invention utilized in conjunction with the Solstice DiskSuite program, the Mediator facility consists of: a user level daemon, rpc.metamedd(1m); a man page, rpc.metamedd.1 m; an enhanced version of rpc.metad(1m); an enhanced version of metaset(1m); and an enhanced version of the device driver, /kernel/drv/md. The user level daemon rpc.metamedd(1m) and its man page are part of the SUNWmdm computer program product. The enhanced versions of the device driver, rpc.metad(1m) and metaset(1m) are distributed as a portion of the SUNWmd computer program product. Hosts selected as Mediator Hosts require that the SUNWmdm computer program be installed. In a dual string configuration, the HA hosts require that both the SUNWmdm and SUNWmd computer program products be installed.

In this particular embodiment, a list of Mediator Hosts is be added to the disksets and the metaset(1m) command's "take ownership" operation is extended to use Mediator Data. The metaset(1m) command's "add host" and "delete host" operations are extended to update Mediator Hosts. The DiskSuite device driver database code is also enhanced to update and use Mediator Data.

Mediator Data is updated by the device driver. The device driver updates the Mediator Hosts when certain events occur. The events are: addition of a Replica, deletion of a Replica, error reading or writing a Replica, addition of a Mediator Host, removal of a Mediator Host, error updating a Mediator Host and user intervention during a "take ownership" operation.

Figure 3A:
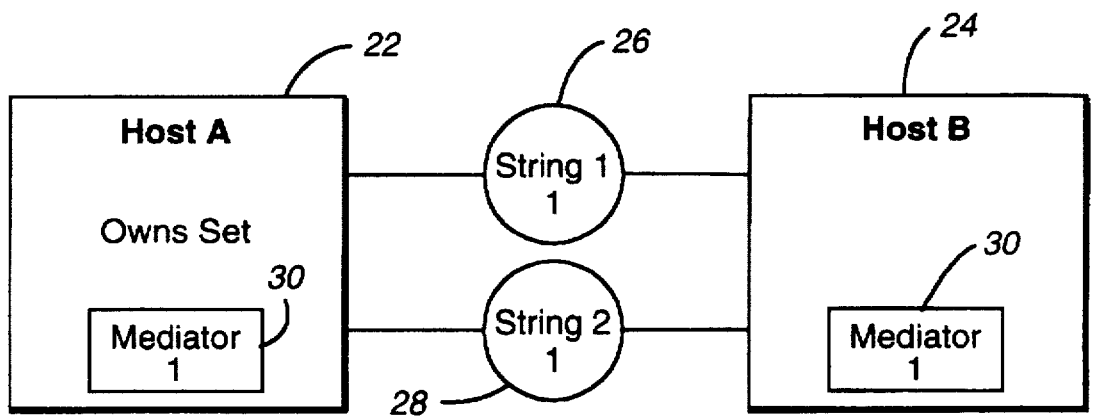
FIG. 3A is an additional, simplified, representational block diagram of the computer system configuration of FIG. 2 showing the system in a steady state status wherein Host A "owns the set" of storage device subsystems.

With reference additionally now to FIG. 3A, the computer system 20 is shown in the "steady state" status, or, that state in which the Mediator Hosts and Replicas agree. Hosts 22 and 24 are both shown as including a Mediator 1 designator 30. Host 22 (Host A) owns the set of disk drives (or diskset) as indicated. Drives 26 and 28 comprise String 1 and String 2 respectively.

The Mediator Host (in this instance, both hosts 22 and 24) tracks which database Replicas are up-to-date. Under the following conditions, no user intervention is required to access the data:

1) The Replica Quorum is not met;
2) HALF the Replicas are still accessible; and
3) the Mediator Quorum is met.

Mediator Hosts are be used under the following conditions:

1) If the Replica Quorum is met, access to the diskset is granted. (No mediator host is involved);
2) if the Replica Quorum is not met, HALF the Replicas are accessible, the Mediator Quorum is met, and the Replica and Mediator Data match, access to the diskset is granted. (The Mediator Host, functioning as a Mediator, contributes the deciding vote.);
3) if the Replica Quorum is not met, HALF the Replicas are accessible, the Mediator Quorum is not met, HALF the Mediator Hosts are accessible, and the Replica and Mediator Data match, the user may be prompted to grant or deny access to the diskset;
4) if the Replica Quorum is not met, HALF the Replicas are accessible, the Mediator Quorum is met, and the Replica and Mediator Data do not match, access to the diskset is read-only. (The user may remove Replicas, release the diskset and retake the diskset to gain read-write access to the diskset.; or
5) in all other cases, access to the diskset is read-only. (The user may remove Replicas, release the diskset and retake the diskset to gain read-write access to the diskset.)

Figure 3B:
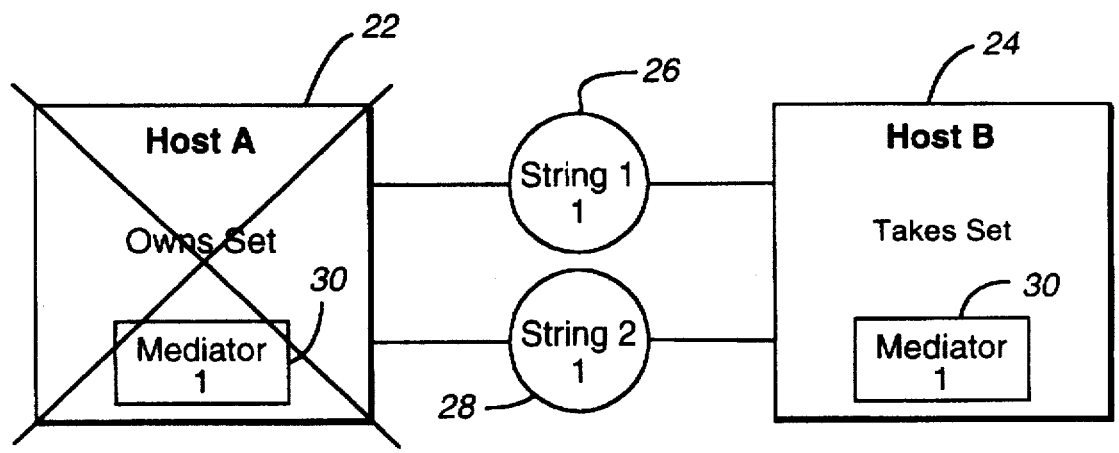
FIG. 3B is a follow-on block diagram of the computer system of FIG. 3A illustrating a general failure of Host A.

With reference additionally now to FIG. 3B, a transition from the "steady state" of FIG. 3A is shown wherein host 22 becomes "lost" or unavailable as indicated by the large "X" therethrough. No Mediator Host updates occur in this scenario due to the absence of an eliciting event. In this case, host 24 (Host B) will be able to execute a "take operation" without user intervention, since all of the Replicas are available to it.

Figure 3C:
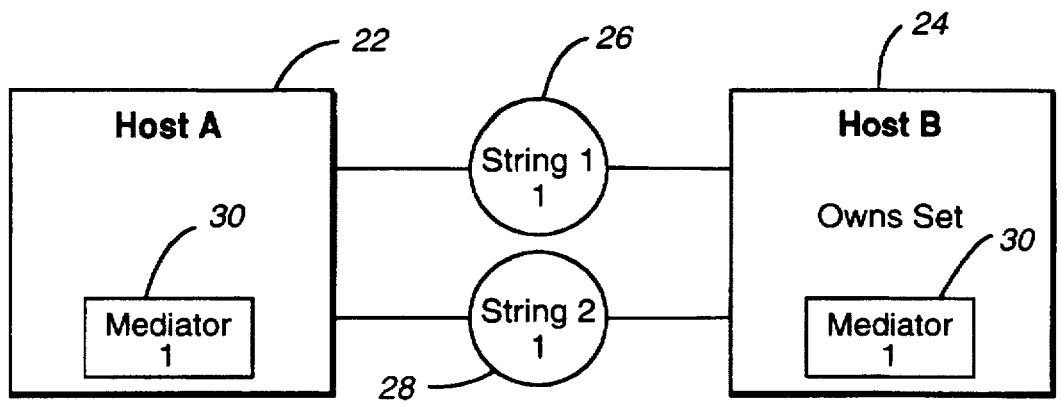
FIG. 3C is an additional, follow-on block diagram of the computer system of FIGS. 3A and 3B illustrating a return to steady state status and wherein Host B now "owns the set" of storage device subsystems.

With reference additionally now to FIG. 3C, the state is shown wherein host 22 (Host A) recovers and the system returns to the "steady state" status of FIG. 3A but wherein Host B owns the diskset.

Figure 4A:
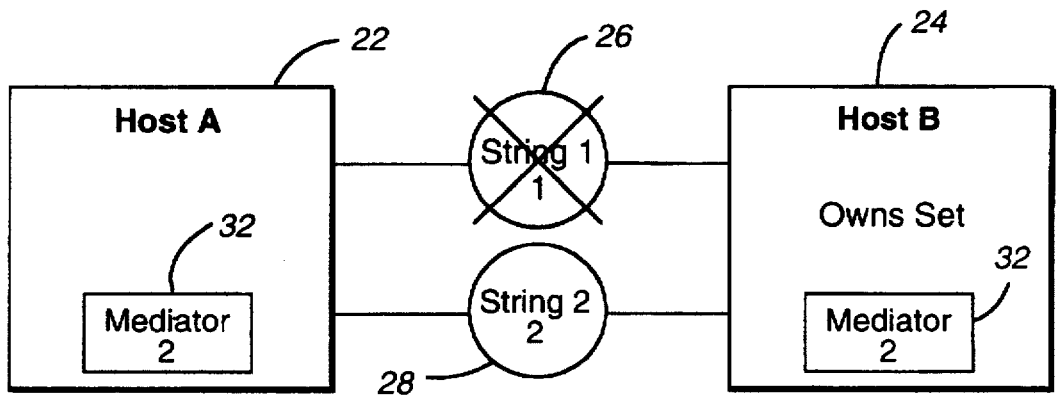
FIG. 4A is a further, follow-on block diagram illustrating an additional possible computer system failure to the computer system of FIG. 3C wherein String 1 of the storage device subsystems is lost.

With reference additionally now to FIG. 4A, the computer system 20 is shown wherein String 1 on drive 26 fails. In this instance, the Mediator Hosts on both Host A (host 22) and Host B (host 24) will be updated (and Host A given a Mediator 2 designator 32) to reflect the event that was detected (error on Replica) and the system 20 will continue to run. Host B will continue to own the set. If desired, Host B can release the set and Host A will then be able to take the set, since the Mediator Quorum is met and the Mediator Hosts and Replicas agree.

Figure 4B:
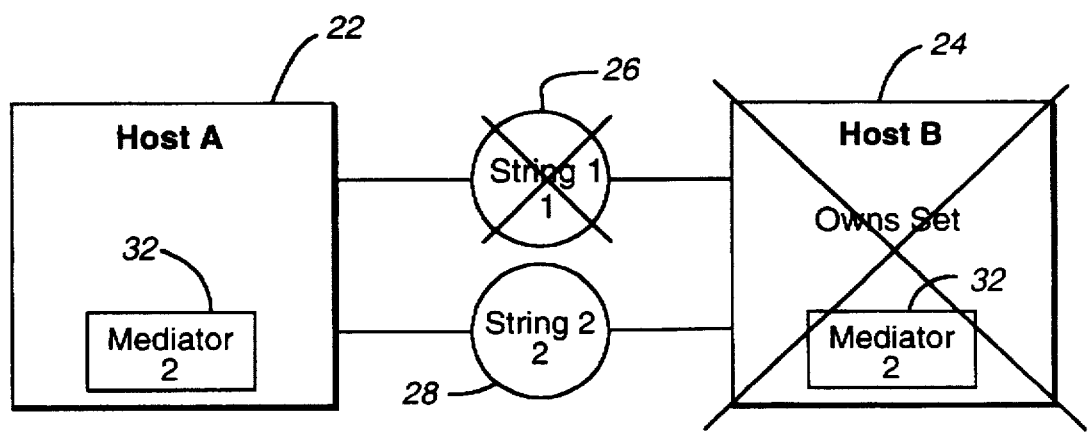
FIG. 4B is another follow-on block diagram illustrating the failure of Host B following the loss of String 1 as shown in the preceding figure.

With reference additionally now to FIG. 4B, the system 20 of FIG. 4A is shown wherein Host B also fails following the failure of String 1. When Host A attempts to take the set, the following conditions exist: 1) The Mediator Quorum is not met; 2) HALF of the Replicas are accessible; and 3) the Mediator Data matches. In this instance, the user may be warned and prompted to determine whether or not the "take operation" will be allowed to succeed. If the user gives the go-ahead, the Replicas will be marked to indicate that the "take operation" was done when no guarantee could be made about the data. The Mediator Hosts and Replicas will be updated and the take operation will succeed.

Figure 4C:
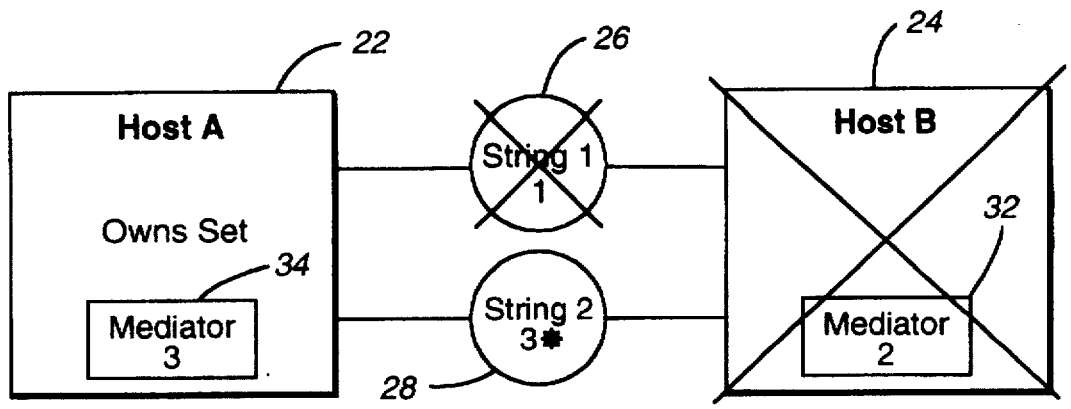
FIG. 4C is still another follow-on block diagram illustrating the occurrence of user intervention to the computer system of FIGS. 4A and 4B wherein the data gets marked and the mediator data is updated.

With reference additionally now to FIG. 4C, the computer system 20 of FIG. 4B is shown following user intervention. In this situation, the data gets marked and the Mediator Data is updated (and host 22 given a Mediator 3 designator 34). As shown, "*" is a symbolic representation of a mark having been placed on the data. If host 22 fails and recovers, the user will be prompted and warned again.

Figure 5A:
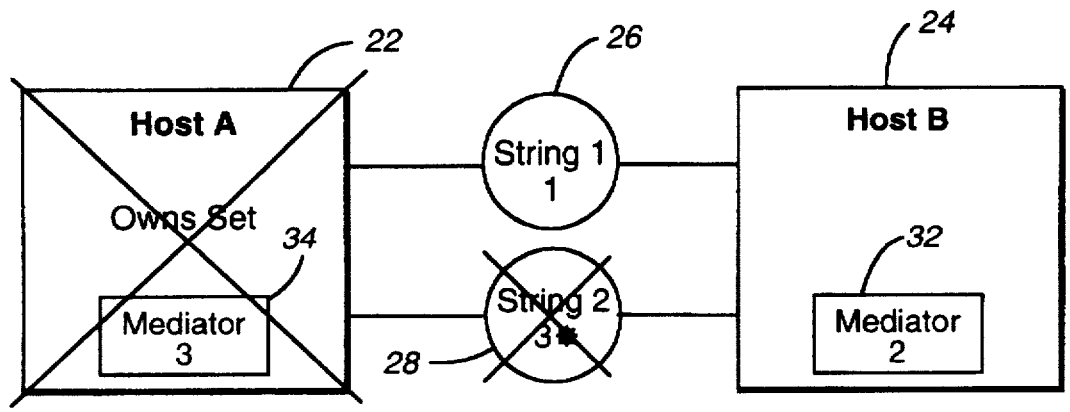
FIG. 5A is a follow-on block diagram of the computer system of FIG. 4C illustrating that a flip-flop has occurred.

With reference additionally now to FIG. 5A, a "flip-flop" has occurred in the system 20. That is, host 22 and String 2 comprising drive 28 go down (or become unavailable) and host 24 and String 1 comprising drive 26 recover (or become available). When a "take operation" is attempted, it will return an error and the data will be read-only. Read-write access to the data can be attained by manually removing Replicas, releasing the diskset and retaking the diskset.

Figure 5B:
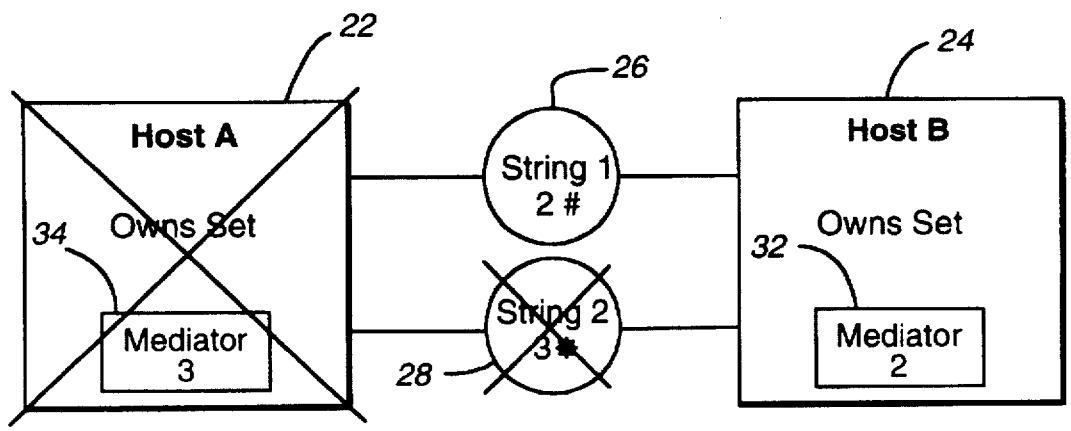
FIG. 5B is an additional follow-on block diagram of the computer system of FIG. 5A illustrating the occurrence of user intervention and wherein a different mark is placed on the data.

With reference additionally now to FIG. 5B, the system 20 of FIG. 5A is shown following user intervention. In this instance, the Replicas will be marked (as indicated by the "#" on drive 26) to indicate user intervention has occurred and the Mediator Data will be updated, akin to the prompted case above.

Figure 6A:
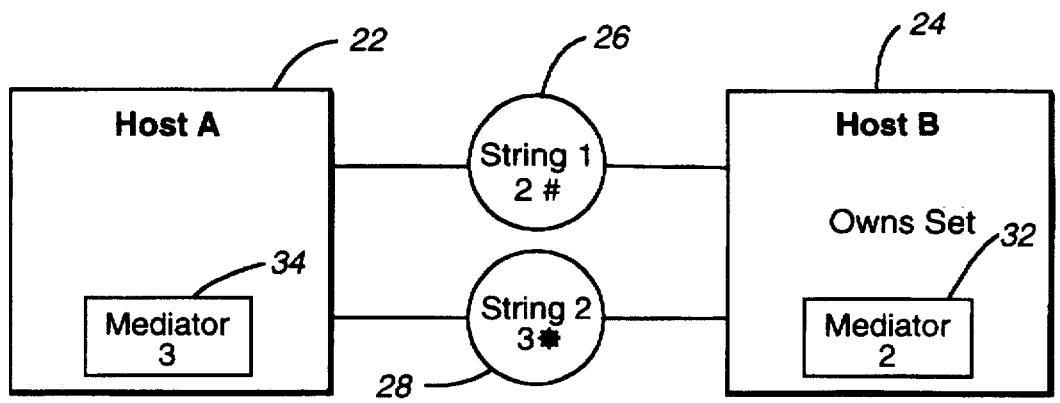
FIG. 6A is a further follow-on block diagram of the computer system of FIG. 5B illustrating that all devices and subsystems are again available but including differing tags.

With reference additionally now to FIG. 6A, the system 20 of FIG. 5B is shown wherein host 22 and String 2 recover. Host B continues to own the set. If Host B releases the diskset and either Host A tries to take the diskset, or Host B retakes the diskset, the marked data will be detected. In this instance, the marks (*,#) will not match and the user will be prompted to select which set of marked data he wishes to use. Once the selection is made, the chosen set of marked data will be copied over the set of marked data that was not chosen, the marks cleared and the Mediator Data updated.

Figure 6B:
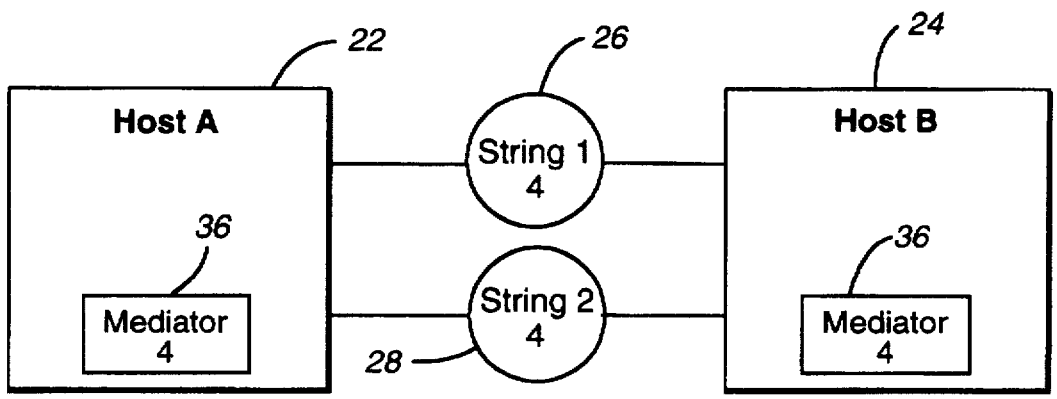
FIG. 6B is an additional follow-on block diagram of the computer system of FIG. 6A illustrating a return to steady state status.

The resultant status is then as indicated in FIG. 6B and the system 20 returns to the "steady state" with Host A now having a Mediator 4 designator 36.

In a particular embodiment of the present invention as implemented in conjunction with the DiskSuite program, Mediator Hosts may be administered using the metaset(1m) command. The current command line interface may also be extended to allow for the addition and deletion of Mediator Hosts to and from a diskset. To add Mediator Host(s), the following syntax may be used:

metaset-s<set>-a-m<mn0>,[mn0a0[,mn0a1]]>[ ... <mn2,[mn2a0[, mn2a1]]>]

To delete Mediator Host(s), the following syntax may be used metaset-s<set>-d-m<mn0>[ ... <mn2>]

where:
  <set> is the name of the diskset to which the Mediator Host is added/deleted;
  <mn0>[ ... <mn2>] are hosts that want to be or that are Mediator Hosts for <set>; and
  <mn0a0>[ ... <mn2a1>] are the names of the private network links for the host.

The order in which the hosts are listed may be the order used when attempting communication with the Mediator Host. It is suggested that the private network names, if available, be listed first, followed by the public network name.

To make a host a Mediator Host, the following steps may be performed: 1) Verify that rpc.metamedd(1m) is installed on each host being added; 2) create the Mediator Record on each host being added; 3) update the diskset record on all the hosts in the diskset; and 4) update the driver's Mediator Host list to include the added hosts. (This also has the effect of causing a Mediator Data update to occur, which insures that new Mediator Hosts have current data.)

To remove a Mediator Host, the following steps may be performed: 1) Update the diskset record on all the hosts in the diskset; 2) update the driver's Mediator Host list to remove the deleted hosts; 3) update remaining Mediator Hosts, if any; and 4) remove the Mediator Record from each Mediator Host being deleted.

When a host is added to a diskset that has Mediator Hosts, the add operation should update the Mediator Hosts. When a host is removed from a diskset that has Mediator Hosts, the delete operation should update the Mediator Hosts.

In conjunction with the DiskSuite implementation described, the metaset(1m) command take operation may be changed to function as described by the following pseudo-code:

```
if ((error = take_set(diskset, mediator_host_list) == OK)
    exit(OK);
if (error != STALE_BUT_HAVE_HALF_ReplicaS)
    exit_data_ro(DATA_IS_STALE);
if ((error = form_mediator_host_quorum(diskset,
    mediator_host_list)) == OK)
    exit (OK);
if (error == ONLY_HALF_MEDIATOR_HOSTS) {
    if (prompt_user ( ) != OK)
        exit_data_ro(DATA_IS_STALE);
    take_and_mark_set(diskset);
    exit(OK);
} else {
    exit_data_ro(DATA_IS_STALE);
}
```

A new daemon, rpc.metamedd(1m), can be utilized to manage a simple database. The database will contain Mediator Data and a Mediator Record per diskset.

The Mediator Data consists of the following: Magic Number—identifies the data as Mediator Data; Revision Number—identifies the version of the Mediator Data; Checksum—checksum of all the fields in the Mediator Data structure; Replica Commit Count—commit count from the Replica; Diskset Identifier—unique identifier for the diskset.

The Mediator Record consists of the following: Magic Number—identifies the data as a Mediator Record; Revision Number—identifies the version of the Mediator Record; Checksum—checksum of all the fields in the Mediator Record structure; Setno—number of the diskset; Setname—name of the diskset; List of Hosts in the Diskset—array of hostnames in the diskset, up to 8; List of Mediator Hosts—array of hostnames that are Mediator Hosts for the diskset, up to 3 names per host and 3 Mediator Hosts per diskset; Mediator Data Offset—an offset in the Mediator Data file used to access the Mediator Data.

The Mediator Data and Record can be accessed using a key that is composed of the hostname and the diskset name, <hostname,setname>. The Mediator Data and Record for a given diskset can have at least 1 <hostname,setname> key to access it, but may have up to 8 (maximum number of hosts in a diskset.)

When the daemon starts up, it reads the file meddata that will be located in the directory /etc/opt/SUNWmd. The file consists of header information followed by Mediator Records and Mediator Data. The file header contains the following: Magic Number—identifies the file as a Mediator Data file; Revision Number—identifies the version of the Mediator Data file; Count—number of Mediator Records in the Mediator Data file; and Checksum—checksum of the file for validation of the contents.

Figure 7:
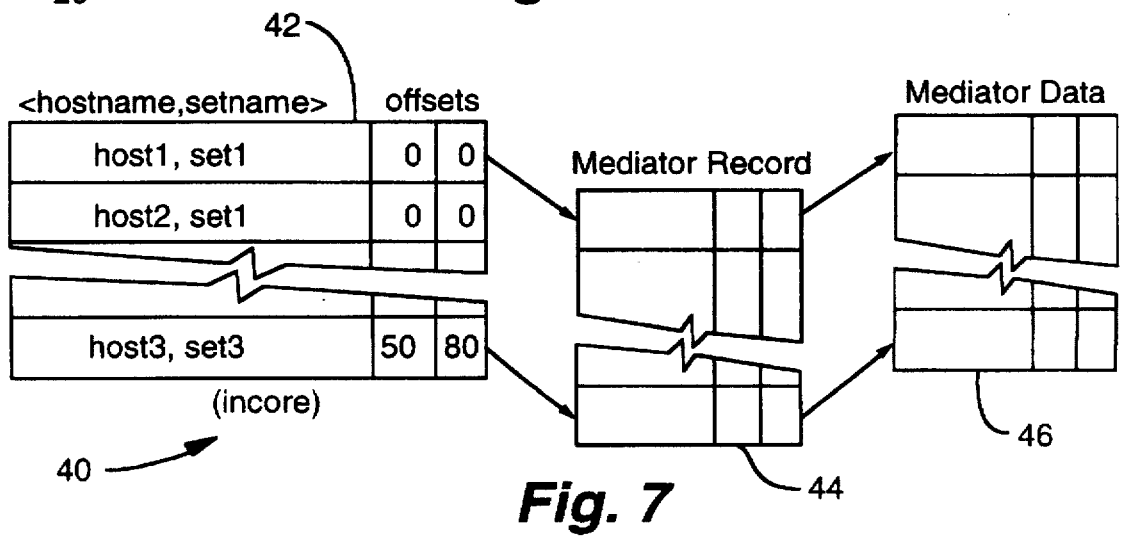
FIG. 7 is a conceptual illustration of the interrelationship between the set {hostname.setname} and the Mediator Record and Mediator Data in the Mediator database.

With reference now to FIG. 7, a conceptual representation of the Mediator Database 40 is shown. Metaset(1m) 42 will update the Mediator Record 44 and the device driver will update the Mediator Data 46. Both the device driver and metaset(1m) will use the Mediator Record 44 to validate requests.

The daemon provides the following operations: Update Mediator Record—this operation will update or add a Mediator Record 44. The scope of the update will be determined by the flags passed to the operation as arguments. The update may update the Mediator Host list, the host list, and/or the setname, or any single one of these items. This operation takes the following arguments: Hostname—name of the host making the request; Setname—name of the diskset on the host making the request; Flags—flags for selecting the type of updated; and Mediator Host List—list of Mediator Hosts.

An array of 3 elements, where each element consists of another array of 3 elements, where each element contains: Hostname—name of the Mediator Host; and Host List—list of hosts in setname.

An array of 8 elements, where each element consists of: Hostname—name of the host in the set.

This operation returns the following results: Common Error Packet—error type and identifier; and Delete Mediator Record.—this operation will handle removal of a Mediator Host from a host for <hostname,setname>. An error will be returned if the <hostname,setname> is not found on the host. This operation takes the following arguments: Hostname—name of the host making the request; and Setname—name of the diskset on the host making the request.

This operation returns the following result: Common Error Packet—error type and identifier; and Get Mediator—this operation will retrieve the Mediator Record and Mediator Data for a given <hostname,setname> from a Mediator Host. An error will be returned if the <hostname,setname> is not found on the Mediator Host. This operation takes the following arguments: Hostname—name of the host making the request; and Setname—name of the diskset on the host making the request.

This operation returns the following results: Common Error Packet—error type and identifier; Mediator Record—as described above; Mediator Data—as described above; and Get Mediator Data—this operation will retrieve the Mediator Data for a given <hostname,setname> from a Mediator Host. An error will be returned if the <hostname, setname> is not found on the Mediator Host. This operation takes the following arguments: Hostname—name of the host making the request; and Setname—name of the diskset on the host making the request.

This operation returns the following results: Common Error Packet—error type and identifier; Mediator Data—as described above; and Update Mediator Data—this operation will update the Mediator Data for a given <hostname, setname> on a Mediator Host. The data will be written to disk synchronously. An error will be returned if the <hostname,setname> is not found on the Mediator Host. This operation takes the following arguments: Hostname—name of the host making the request; and Setname—name of the diskset on the host making the request, with the Mediator Data—as described previously. This operation returns the following result: Common Error Packet—error type and identifier.

In conjunction with the DiskSuite implementation of the present invention, the device driver may be enhanced to do RPC to communicate with rpc.metamedd(1m). The mddb_set structure can be extended to include a list of Mediator Hosts. This list of Mediator Hosts may consist of the following: An array of 3 elements, where each element consists of: another array of 3 elements, where each element contains: Hostname—name of the Mediator Host; IP Address—network address of the Mediator Host; and Flags—flags indicating the status of this path to the Mediator Host. The function that determines if the database is stale, will be extended to indicate the new condition, stale_but_have_half.

In the database computer program instructions where a commit count update occurs, new computer program code may be added to update the Mediator Data on the Mediator Hosts. If the Mediator Data update can not be pushed to HALF of the Mediator Hosts, access to the data can be denied immediately by panic()'ing. If the Mediator Quorum can be met, but some of the Mediator Hosts are not available, the unavailable hosts can be flagged as such and the commit count bumped and all available Mediator Hosts updated.

New ioctl()'s can also be provided for getting and setting the mddb_set structure's list of Mediator Hosts. When the list of Mediator Hosts is updated, the new list, if any, can be used to push the Mediator Data to all the Mediator Hosts. This may be done so that new Mediator Hosts will get an up-to-date copy of the Mediator Data.

The Replica selection code can also be modified to detect marked data and return an error indication. The Replica (locator block) can be extended to include fields to mark the data with hostid and a timestamp. A new ioctl() can be provided to get the marking information from the kernel so that the user can make the selection of marked data. A new ioctl() can be provided to indicate which set of marked data the user has selected and initiate the reconciliation process.

The existing rpc.metad(1m) daemon can be extended by adding two operations: Get Set Mediator List—this operation will retrieve the Mediator Host list associated with a diskset or an error if no Mediator Host list exists for the diskset; and Update Set Mediator List—this operation will add a Mediator Host list or replace an existing Mediator Host list to a diskset.

Normally if HALF+1 of the Replicas are accessible, then the Replicas with the largest commit count are the most up-to-date. When exactly HALF the Replicas are accessible then the Mediator's commit count can be used to determine if this half is the most up-to-date. To guarantee that the correct Mediator commit count is being used, HALF+1 of the Mediators must be accessible (Mediator Quorum). The Mediator Quorum is independent of the Replica Quorum mentioned earlier. When a Mediator Quorum is not obtainable, this is treated as if there were no Mediators at all, requiring a Replica Quorum to have access to the database.

Mediator information is used when exactly HALF the database Replicas are accessible. If HALF+1 or more Replicas are accessible then the Mediator information is not needed or used. If fewer than HALF the Replicas are accessible then the database is stale and is in a read-only mode.

The system and method of the present invention prevents "split brain" scenarios by requiring a Replica Quorum to determine when "safe" operating conditions exist. This methodology guarantees data correctness. As previously described, with a dual string configuration it is possible that only one string is accessible. In this situation, it is impossible to get a Replica Quorum and modulo asymmetric Replica layouts and then the one string with the majority of Replicas must be accessible.

In a DiskSuite implementation of the present invention, Mediators may be administered by the metaset(1m)

command, allowing Mediators to be added and deleted. Metaset can also function to pass the Mediator information to the metadevice driver, if a Mediator Quorum is obtained. The metadevice driver will need to use the Mediator information if and only if HALF the Replicas are accessible. It is also the metadevice driver's job to update the Mediator information when database Replicas are added, deleted, or have developed I/O errors; that is, when the database Replicas' commit count is changed. Updates to the Mediator information are ideally two stage updates. This guarantees that even in the event of a Mediator node failure the commit count on the active Mediators will always be higher than any unaccessible Mediator.

Multiple Mediators can also be used to provide better reliability. To use the Mediators' information, HALF+1 of the Mediators must be accessible. When Mediator information is being updated at least HALF must be accessible, otherwise the validity of the information can not be assured. The use of multiple Mediators is, however, not required.

Failures in the configurations below described with respect to the remaining figures may be addressed by the use of Mediators as disclosed herein. With respect to these figures, the designations "H1" and "H2" correspond to host 1 and host 2 respectively; the designations "S1" and "S2" correspond to String 1 and String 2, and it is assumed that there are an equal number of Replicas on each string.

Figure 8:
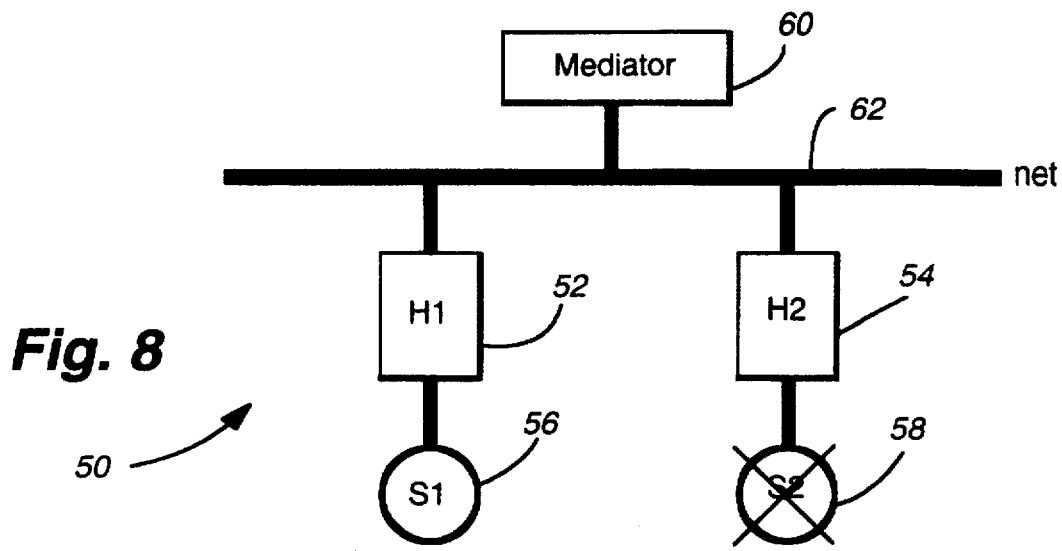
FIG. 8 is a further block diagram illustration of a representative computer system incorporating, for example, a single Mediator Host as disclosed herein for providing Third Voter ("TV") data to allow for failover and switch-over situations in the case of a single storage string failure.

With specific reference now to FIG. 8, computer system 50 is shown incorporating a pair of host computers 52, 54 each respectively coupled to a computer mass storage device string 56, 58. The hosts 52, 54 may be coupled to a third host 60 functioning as a Mediator by means of a network connection 62 as shown. The Mediator host 60 provides the third voter data to allow diskset ownership for failover and switchover situations in the single string failure situation illustrated.

Figure 9A:
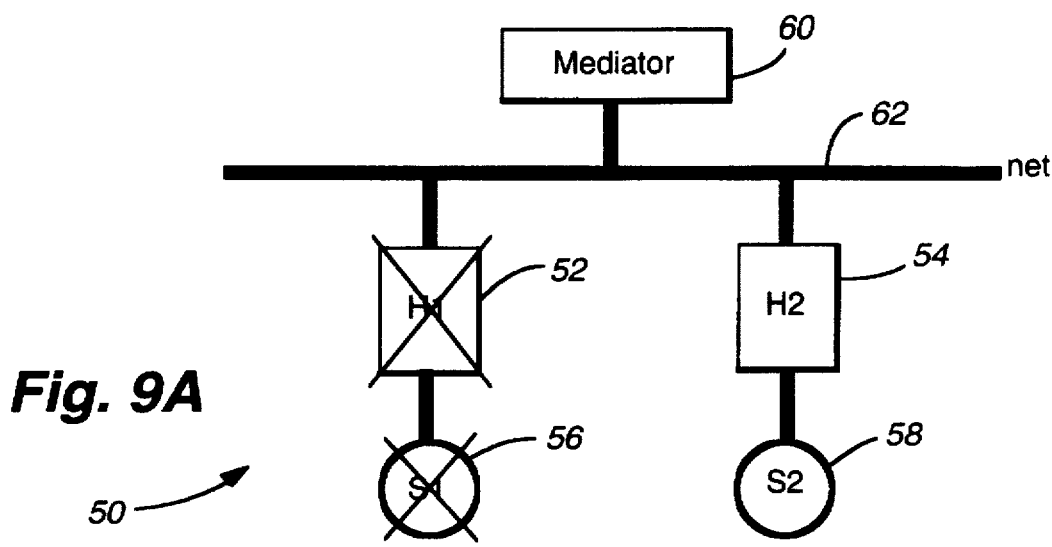
FIGS. 9A and 9B are additional block diagrams useful in illustrating that multiple failure recoveries (i.e. one Host and one storage string failure) are possible in the case of a Mediator residing on a third independent Host computer.
Figure 9B:
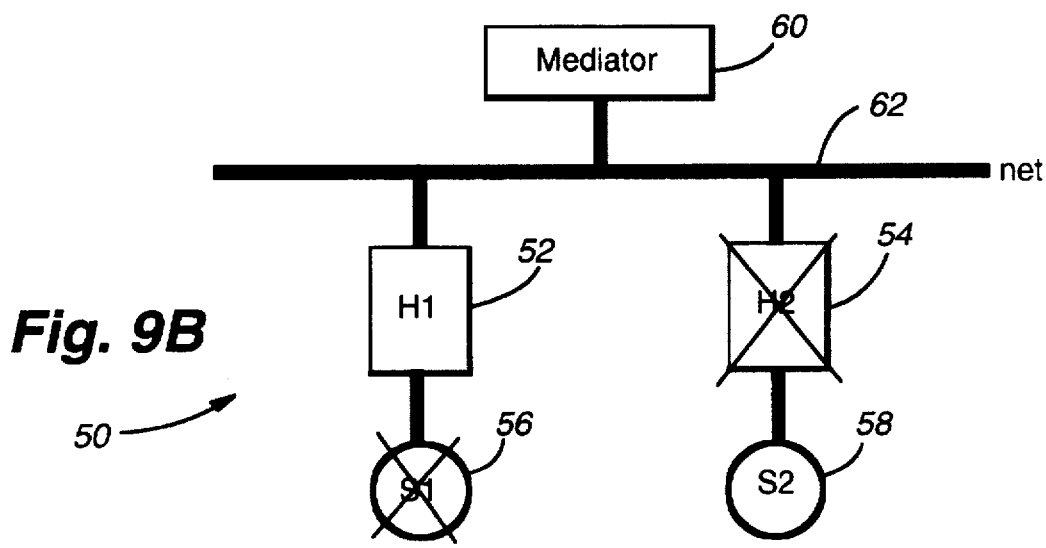

With reference additionally now to FIGS. 9A and 9B the, system and method of the present invention may be implemented such that multiple failure recoveries are possible in those configurations wherein the Mediator host 60 is a third independent host. Diskset ownership is allowed for failover and switchover situations, even after reboots.

Figure 10A:
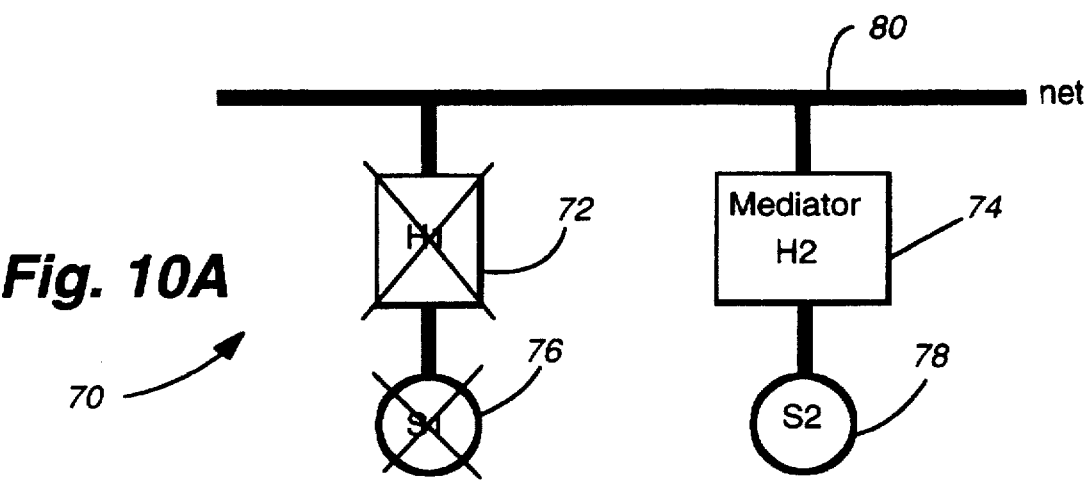
FIGS. 10A and 10B illustrate situations wherein one of the HA hosts is utilized as a Mediator and the failure situations wherein the other Host or string can fail yet still be recovered.
Figure 10B:
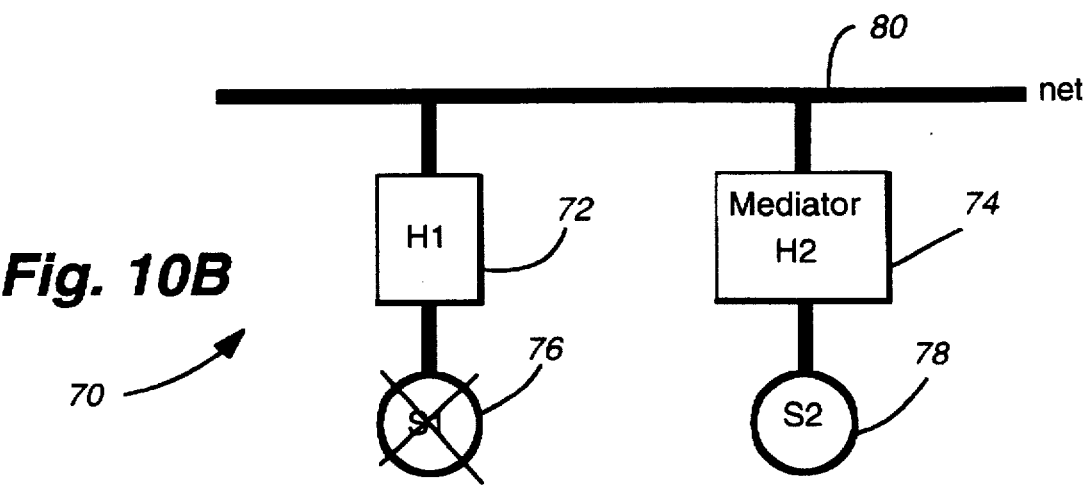

With reference additionally now to FIGS. 10A and 10B an alternative implementation of the system and method of the present invention is shown in conjunction with a computer system 70 comprising, in pertinent part, a pair of hosts 72, 74 and Strings 76 and 78, with the hosts 72, 74 being coupled to a common network 80. The configuration of the computer system 70 illustrated wherein, if one HA host (for example host 74) is used as a Mediator, then the other host (for example host 72) can fail as well as either String 76 or 78, and the database be recovered since the Mediator Data is still accessible. In those instances wherein the host acting as the Mediator fails, then a one String failure cannot be resolved because the Mediator Data is not accessible.

Figure 11:
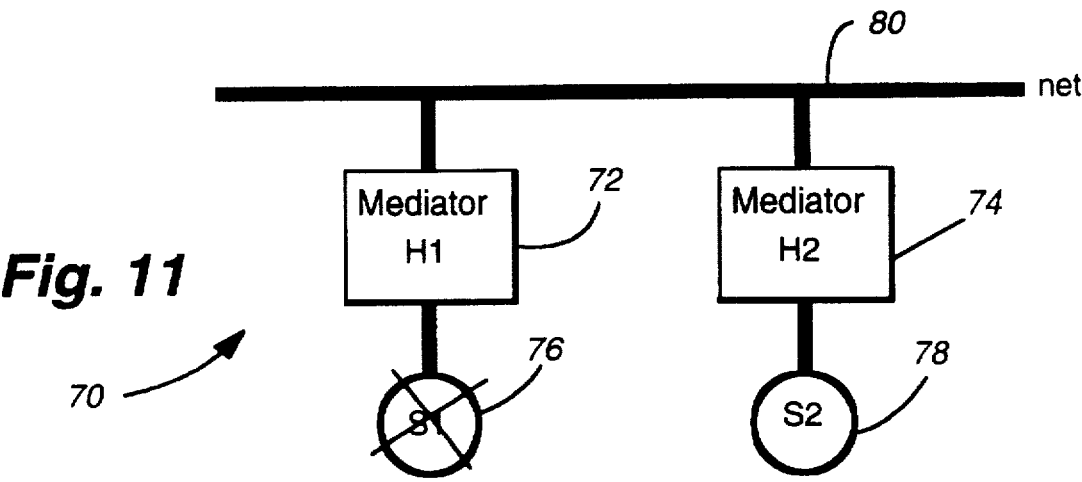
FIG. 11 illustrates a possible computer system configuration wherein both Hosts are utilized as Mediators and wherein a single string failure can be resolved due to the fact that the Mediator Host's data is still accessible.

With reference additionally now to FIG. 11, an alternative computer system 70 illustrates that if both of the HA hosts (hosts 72 and 74) are used as Mediators, then a one String failure can be resolved, since the Mediator Data is still accessible. In such a two host Mediator configuration if either host acting as the Mediator fails then a one string failure cannot be resolved because HALF+1 Mediators will not be accessible.

What has been provided, therefore, is a system, method and computer program product for ensuring that a replicated computer database does not encounter a "split brain" problem by replicating the database and requiring a replica quorum wherein at least (50%+1) of the replicas are accessible and in agreement. In those instances wherein a replica quorum in not obtainable, but 50% of the copies of the data are in agreement, an external source, or "mediator" provides a deciding vote (+1) to ensure that the data can be trusted.

While there have been described above the principles of the present invention in conjunction with specific computer program implemented processes and computer configurations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A computer implemented method for ensuring the selection of a most current copy of a group of database copies in a replicated database of a computer system, said method comprising the steps of:

provided a plurality of state database replicas, wherein each replica is used to store configuration of metadevices and the state of said metadevices associated with one of the database copies;

establishing at least one mediator for monitoring the currency of accesses to said replicas;

determining availability of each replica;

comparing data in each available replica with data stored in the at least one mediator to determine if each available replica is current; and in response to determining that half of the replicas are available, relying on said database copies associated with said available replicas if said at least one mediator indicates that said replicas are current.

2. The computer implemented method of claim 1 further comprising the step of:

in response to determining that more than half of the replicas are available, relying on said database copies associated with said available replicas independent of said at least one mediator.

3. The computer implemented method of claim 1 wherein said step of establishing is carried out by the step of:

furnishing at least one host computer forming a portion of said computer system, said at least one host computer serving as said at least one mediator.

4. The computer implemented method of claim 3 wherein said step of furnishing is carried out by the step of:

interconnecting a pair of said at least one host computers by means of a network connection, at least one of said pair of said at least one host computers serving as said at least one mediator.

5. The computer implemented method of claim 3 further comprising the step of:

distributing said database copies and replicas among a plurality of computer mass storage devices operatively controlled by said at least one host computer.

6. A computer program product comprising:

a computer useable medium having computer readable code embodied therein for ensuring the selection of a most current copy of a group of database copies in a replicated database of a computer system, the computer readable code comprising:

computer readable program code devices configured to cause a computer to effect establishing a plurality of state database replicas, wherein each replica is used to store configuration of metadevices and the state of said metadevices associated with one of the database copies;

computer readable program code devices configured to cause a computer to effect establishing at least one mediator for monitoring the currency of accesses to said replicas;

computer readable program code devices configured to cause a computer to effect determining availability of each replica;

computer readable program code devices configured to cause a computer to effect comparing data in each available replica with data stored in the at least one mediator to determine if each available replica is current; and computer readable program code devices responsive to said comparing program code devices and configured to cause a computer to effect relying on said database copies associated with said available replicas if said at least one mediator indicates that said replicas are current.

7. The computer program product of claim 6 further comprising:

computer readable program code devices responsive to said program code devices determining that more than half of the replicas are available and configured to cause a computer to effect relying on said database copies associated with said available replicas independent of said at least one mediator.

8. The computer program product of claim 6 wherein said computer readable program code devices configured to cause a computer to effect establishing at least one mediator is carried out by:

computer readable program code devices configured to case a computer to effect furnishing at least one host computer forming a portion of said computer system for serving as said at least one mediator.

9. The computer program product of claim 8 wherein said computer readable program code devices configured to case a computer to effect furnishing at least one host computer forming a portion of said computer system is carried out by:

computer readable program code devices configured to cause a computer to effect interconnecting a pair of said at least one host computers by means of a network connection wherein at least one of said pair of said at least one host computers serves as said at least one mediator.

10. The computer program product of claim 8 further comprising:

computer readable program code devices configured to cause a computer to effect distribution of said database copies and replicas among a plurality of computer mass storage devices operatively controlled by said at least one host computer.

11. A method for ensuring the selection of a most current copy of a group of database copies in a replicated database of a computer system, said method comprising the steps of:

providing for establishing a plurality of state database replicas, wherein each replica is used to store configuration of metadevices and the state of said metadevices associated with one of the database copies;

providing for establishing at least one mediator for monitoring the currency of accesses to said replicas;

providing for determining availability of each replica;

providing for comparing data in each available replica with data stored in the at least one mediator to determine if each available replica is current; and providing for in response to determining that half of the replicas are available, relying on said database copies associated with said available replicas if said at least one mediator indicates that replicas are current.

12. The method of claim 11 further comprising the step of:

providing for relying on said database copies associated with said available replicas independent of said at least one mediator database copies if said data therein is in in response to determining that more than half of the replicas are available.

13. The method of claim 11 wherein said step of providing for establishing is carried out by the step of:

providing for furnishing at least one host computer forming a portion of said computer system, said at least one host computer serving as said at least one mediator.

14. The method of claim 13 wherein said step of providing for furnishing is carried out by the step of:

providing for interconnecting a pair of said at least one host computers by means of a network connection, at least one of said pair of said at least one host computers serving as said at least one mediator.

15. The method of claim 13 further comprising the step of:

providing for distributing said database copies and replicas among a plurality of computer mass storage devices operatively controlled by said at least one host computer.

16. A computer system for use in conjunction with a replicated data system comprising a plurality of host computers coupled together through a network connection, at least two of said plurality of host computers each controlling at least one of a number of computer mass storage devices and each computer mass storage device comprises at least one copy of said replicated data system, said computer system comprising:

a state database replica established in each computer mass storage device, wherein each replica is used to store configuration of metadevices and the state of said metadevices associated with said copy of said replicated database therein;

at least one mediator established in conjunction with at least one of said plurality of host computers, said mediator for monitoring the currency of accesses to said replicas, said computer system relying on data in said replicas when more than half of said replicas are available independently of said mediator and alternatively relying on said data when half of said replicas are available if said at least one mediator indicates that said replicas are current.

17. The computer system of claim 16 wherein said at least one mediator comprises one of said at least two host computers.

18. The computer system of claim 17 wherein said at least one mediator comprises a pair of mediators, each of said pair of mediators comprising one of said at least two host computers.

* * * * *

UNITED STATES PATENT AND TRADEMARK OFFICE
CERTIFICATE OF CORRECTION

PATENT NO. : 5,740,348
DATED : April 14, 1998
INVENTOR(S) : Joseph E. Cunliffe and Dale R. Passmore It is certified that error appears in the above-indentified patent and that said Letters Patent is hereby corrected as shown below:

Column 13, line 46, change "case" to
    --cause--

Column 13, line 50, change "case" to
    --cause--

Column 14, line 18, the clause "database copies
    if said data therein is in" should be
    deleted Signed and Sealed this Eighteenth Day of August, 1998

Attest:

BRUCE LEHMAN

Attesting Officer

Commissioner of Patents and Trademarks